United States Patent [19]
Boege et al.

[11] Patent Number: 5,979,238
[45] Date of Patent: Nov. 9, 1999

[54] STRIP-SHAPED RESILIENTLY FLEXIBLE MEASURING TAPE FOR LENGTH—OR ANGLE-MEASURING DEVICES

[75] Inventors: Ludwig Boege; Hans-Joachim Freitag, both of Jena, Germany

[73] Assignee: Carl Zeiss Jena GmbH, Jena, Germany

[21] Appl. No.: 08/945,833

[22] PCT Filed: Mar. 20, 1997

[86] PCT No.: PCT/EP97/01421

§ 371 Date: Nov. 5, 1997

§ 102(e) Date: Nov. 5, 1997

[87] PCT Pub. No.: WO97/36149

PCT Pub. Date: Oct. 2, 1997

[30] Foreign Application Priority Data

Mar. 26, 1996 [DE] Germany .......................... 196 11 983

[51] Int. Cl.$^6$ .............................. G01P 15/00; G01B 3/10
[52] U.S. Cl. ................................. 73/490; 33/755; 33/758
[58] Field of Search .................... 73/490; 33/700, 33/732, 755, 758

[56] References Cited

U.S. PATENT DOCUMENTS

| | | | |
|---|---|---|---|
| 3,603,929 | 9/1971 | Drysdale | 73/490 |
| 3,724,083 | 4/1973 | Mehl | 33/755 |
| 4,546,650 | 10/1985 | Cameron | 73/490 |
| 5,258,861 | 11/1993 | Tsuchiya . | |
| 5,732,475 | 3/1998 | Sacks et al. | 33/512 |

FOREIGN PATENT DOCUMENTS

| | | |
|---|---|---|
| 1176382 | of 1959 | Germany . |
| 7908975 | of 1979 | Germany . |
| 3226132 | of 1982 | Germany . |
| 4204878 | of 1992 | Germany . |
| 9526518 | of 1995 | Germany . |
| 9526517 | of 1996 | Germany . |

*Primary Examiner*—Max Noori
*Attorney, Agent, or Firm*—McAulay Nissen Goldberg Kiel & Hand, LLP

[57] ABSTRACT

A strip-shaped, elastically flexible measurement strip for length measuring devices or angle measuring devices having a measurement scale is formed of two elastically flexible stripes which adhere to one another via a viscous intermediate film, the measurement scale being applied to one of these stripes.

22 Claims, 2 Drawing Sheets

STRIP-SHAPED RESILIENTLY FLEXIBLE MEASURING TAPE FOR LENGTH— OR ANGLE-MEASURING DEVICES

BACKGROUND OF THE INVENTION a). Field of the Invention

The invention is directed to a strip-shaped, elastically flexible measurement strip for length measuring devices or angle measuring devices which is provided with a graduated measurement scale.

b). Description of the Related Art

Such measurement strips are used industrially for length measurements and angle measurements, e.g., for machine tools or the like, wherein a measurement strip is fastened in a suitable manner, for example, at the machine bed of the machine tool or at its clamping table, and its scale is sensed by a measurement head which is suitably connected with the other part. In order to fasten the measurement strips, the measurement strip is either glued directly to its associated receiving base by means of a suitable glue or is fastened, via a measurement scale body in which the measurement strip is held, e.g., also by means of gluing, to this measurement scale body.

When the measurement strip is glued on, mechanically induced internal stresses inevitably build up therein, either because of the required contact pressure forces when gluing on, since there can never be contact pressure without longitudinal forces, or because of internal stresses resulting from the hardening or ageing of the glue, or because of thermal stresses due to different thermal expansion coefficients of the measurement strip and measurement scale carrier or receiving base. Because of this, substantial errors can result when measuring which considerably impair the accuracy of such a measuring system. A further possible source of error in measurement strips is the occurrence of bending in the measurement strip because the surface of the measurement strip which generally carries the measurement scale changes in length when the measurement strip bends. Local tensile stresses and compressive stresses, which also cause longitudinal errors, occur in the measurement strip depending in each case on the local position in relation to the neutral grain or fiber. This longitudinal error increases as the distance increases from the neutral fiber and therefore as the thickness of the measurement strip increases so that, to minimize this error, it is desirable to use the thinnest possible measurement strips. However, with decreasing thickness of the measurement strip the inherent strength or inherent stability of the measurement strip drops sharply, as a result of which minor mechanical stresses such as inevitably occur in the gluing process lead to the occurrence of noticeable errors, for which reason the use of thicker and accordingly more inherently stable measurement strips is desirable from this point of view.

An article in "F & M Feinwerktechnik und Meßtechnik", Vol. 80, No. 7, pages 333ff, describes a measurement strip in which a groove is machined into a stainless steel measurement scale body to receive a thin steel strip with the measurement scale which is cemented therein. For the purpose of reinforcing the cement connection, the steel strip is connected laterally via welds with the associated carrier body. In this solution, although the carrier body and measurement strip are produced separately and the measurement strip can accordingly be produced with the desired length in an economical manner, the attainable accuracy of the measuring system is limited because the relatively low longitudinal stiffness of the thin steel strip, the unevenness in the strip, the inhomogeneity of the glue layer, and the scale errors caused by the bending of the scale body lead to errors which can no longer be overlooked.

A measurement device in which a scale is fastened in a flat manner on a metallic carrier by means of a silicone rubber glue layer is known from DE-PS 25 05 587. In this type of elastic fastening of the measurement scale on a stable base body, there are still extensive constraining forces which cannot be ignored and which can result in turn in deformations of the measurement scale, because the elastic adhesive forces of the glue layer can still be unacceptably large especially when the scales are relatively thin.

In another type of measurement system described, for example, in PCT-WO19/02919, a self-adhesive steel-strip measurement scale is aligned via an applicator to the operating sequence of the slide and is glued onto the machine bed or onto a base body. This known measurement system is very complicated to assemble and the attainable accuracy of the measurement system is only relatively limited, since the inherent stability of the measurement strip is rather low and even very slight mechanical stresses or differences in tension lead to corresponding errors. The linearity error of such glued measurement strips amounts to as much as approximately 40 $\mu$m/m of the measurement strip. The attainable accuracy is accordingly sharply restricted and the scale errors must be corrected electronically by calibrating measurements, e.g., by means of a laser interferometer, which additionally complicates measurement and requires an electronic correction device.

OBJECT AND SUMMARY OF THE INVENTION

On this basis, the primary object of the invention is to further develop a measurement strip of the type mentioned above in such a way that it has an adequate longitudinal stability in spite of a limited thickness and the errors occurring during assembly and during bending movements are particularly minor.

This object is met, according to the invention, in a measurement strip of the generic type in that it is formed of two elastically flexible stripes which adhere to one another via a viscous intermediate film, the measurement scale being applied to one of these stripes.

In the measurement strip according to the invention, the coupling is produced by the capillary action of the viscous intermediate layer so that the strips are extensively uncoupled from one another with respect to the occurring mechanical stresses. At low displacement speeds of the strips relative to one another, no adhesive friction occurs between them; however, the strips are held together firmly and form a stable composite action on the whole due to the relatively extensive capillary action of the viscous intermediate film, that is, of a thin viscous intermediate layer. In this respect, the capillary action also effectively prevents the viscous intermediate film from flowing out. When faster displacement speeds occur between the two strips, the viscous frictional force generated by the viscous intermediate film sharply increases between these strips so that high stability is also achieved in the longitudinal direction of the bond. As a result of this type of coupling, the occurring tension in the elastically flexible stripe which does not have the measurement scale is uncoupled from the other stripe carrying the measurement scale, and the deformation component connected with the former is not transmitted to the other stripe. However, even when bending movements proceed gradually, the use of the stripes which are connected with one another in a viscous manner makes it possible to keep the stripe carrying the measurement scale thin while nevertheless, by way of the cooperation with the other stripe in composite action, obtaining a longitudinal stiffness in the longitudinal direction which is appreciably greater than that of the stripe with the measurement scale. Due to the fact that the two stripes are completely uncoupled with respect to tension, the temperature-induced longitudinal changes of the stripe which is fastened to the base (and which normally carries the measurement scale), as well as changes in length of the machine part to which it is attached, are not transmitted to the stripe carrying the measurement scale: the thermal expansion behavior of the stripe carrying the measurement scale (and therefore of the measurement strip) is accordingly describable in a particularly simple manner and is independent from the thermal expansion coefficients of the fastening receptacle and of the viscous intermediate film. Due to its flat contact and a very small thickness, the latter also provides for a good temperature compensation between the two strips.

Another advantageous construction of the measurement strip according to the invention consists in that the stripe not carrying the measurement scale can, in turn, comprise two strips adhering to one another by means of a viscous or an elastic intermediate film, which makes it possible for the stripe carrying the measurement scale to be even thinner while nevertheless obtaining a good longitudinal stability of the measurement strip with a very good uncoupling of the individual stripes with respect to tension.

In the measurement strip according to the invention, the viscous intermediate film can be selected from any suitable viscous medium, but preferably comprises silicone oil, preferably with a thickness of 1 $\mu$m to 5 $\mu$m. Another preferred medium for the viscous intermediate film is silicone grease. In a particularly preferable manner, the kinematic viscosity of the viscous intermediate film ranges from 3,000 mm$^2$/s to 50,000 mm$^2$/s. It has been shown that when using an intermediate layer with a greater viscosity, the time period for tension equilibrium between the individual strips can be too long, and when a viscous medium with an even lower viscosity is used, there is the risk that the strips can detach from one another as the result of brief high displacement forces between the strips. Silicone oil, like silicone grease, has proven especially suitable also with respect to long-term durability and compatibility compared with the preferably used metal strips for the individual stripes.

Steel strips with a ground or polished surface have proven particularly suitable as stripes, wherein both stripes are particularly preferably made of spring steel with a thickness of 250 $\mu$m. In an especially preferable manner, a particularly highly reflective surface layer is applied to the stripe carrying the scale; this highly reflective surface layer makes it possible to provide a particularly high-quality microstructure, which is important for optical signal quality, and a particularly high-quality reflectance of the reflecting surface of this stripe, which, in steel strips, is somewhat more technically complicated to produce directly and is accordingly more expensive. It is therefore especially economical to apply a special, more favorably reflecting surface layer of this kind on the stripe carrying the scale.

The measurement strip according to the invention is preferably constructed in such a way that the stripe not carrying the scale is wider than the stripe carrying the scale, which provides the advantage that the fastening means of the other stripe, which is to be fastened, for example, to the machine bed, can engage in this laterally overlapping edge region.

In another advantageous further development of the measurement strip according to the invention, the two stripes are made of materials having different thermal expansion coefficients, so that the stripe to be fastened to the machine bed or the like (fixing stripe) can be adapted particularly well to the machine bed with respect to occurring temperature stresses, while the stripe carrying the measurement scale (scale stripe) can be configured precisely with respect to the slightest possible thermal expansions. In this respect, the viscous intermediate layer between the two stripes makes it possible for the occurring thermal expansions which differ between the two stripes to be uncoupled from one another, in spite of the active coupling of the two stripes to one another by means of the viscous intermediate layer.

Another advantageous construction of the invention consists in that the two stripes are fixedly connected with one another at a location, preferably at one of the two ends of the measurement strip or approximately in the center of the measurement strip. This affords the advantage that an exact correspondence between a determined location of the two strips relative to one another is ensured under all operating conditions, even if the strips are subject to different temperature-induced or stress-induced longitudinal changes due to different stresses or different characteristics during operation.

The measurement strip according to the invention can preferably also be used for constructing an angle measuring device, wherein it is arranged around the outer circumference of a cylindrical base body for this purpose. The stripe not carrying the measurement scale preferably contacts the base body, wherein it is preferably again connected with the cylindrical base body in a frictional and/or positive engagement. For this purpose, the stripe which is fastened to the base body, does not carry the measurement scale, and is connected with the other stripe via the viscous intermediate film serves as a kind of compensating strip. Such stripes are commercially available in a large variety of thicknesses. Since it is very difficult and complicated, especially with large-diameter angle measuring devices, to produce the required diameter of the base body exactly as is necessary for a given number of periods or cycles on the circumference of the measurement strip, wherein a deviation from the reference diameter of the base body of only 10 $\mu$m, for example, leads to a circumferential deviation of more than 30 $\mu$m, the invention offers the great advantage that, when using the measurement strip according to the invention, the strict requirements for close tolerances with respect to the diameter of the base body can be appreciably relaxed: the thickness of the stripe (compensation strip) fastened to the base body need only be selected in such a way that the actual diameter of the base body together with the thickness of the compensation strip lead to an optimum tension of the stripe carrying the scale. In addition, the surface roughness present on the surface of the base body can also be almost completely compensated by the stripe (compensation strip) of the measurement strip, according to the invention, placed on this surface. In the event that a base body with an especially good surface quality and exact diameter is already available, the stripe carrying the scale can also be applied directly to the base body via a viscous intermediate layer and can be connected therewith, wherein in the case of the second stripe acting as "compensation strip" this is no longer necessary. In contrast to known angle measuring devices in which, during the adjustment of the joining location of the measurement strip wrapped around the circumference of the base body, the measurement strip stretches and the considerable tensile stresses resulting from the angle or degree of wrap and the relatively high sliding friction between the measurement strip and the receiving body cannot be uniformly distributed along the circumference of the measurement strip, an extensive uncoupling of the mechanical stresses occurring in the two strips is achieved when using the measurement strip according to the invention due to the capillary action of the viscous intermediate layer and, in particular, in the stripe extending around the circumference of the base body, the deformation component occurring therein is not transmitted to the stripe carrying the measurement scale.

When the measurement strip according to the invention is used for an angle measuring device, the stripe not carrying the measurement scale is preferably connected with the base body in a frictional engagement and/or in a positive engagement and, further, preferably has lateral guide elements for the stripe carrying the measurement scale. It is further advantageous when the stripe carrying the measurement scale is subjected to tensile stress in the installed state, wherein its ends are preferably connected with one another by tension locks.

The stripe of the measurement strip according to the invention, which stripe carries the measurement scale, preferably does not extend entirely along the circumference of the base body, wherein it is preferably fixedly connected with the base body in at least one location.

In the measurement strip according to the invention, the occurring bending stresses in the individual strips or stripes are sharply reduced especially in the thin stripe which carries the measurement scale because, in the case of gradually proceeding bending movements, the stresses in the individual strips build up in such a way that they are substantially uncoupled, since there is virtually no transmission through the viscous intermediate film to the adjacent stripe and the occurring bending stresses also remain very small because of the small thickness which can be selected for the individual stripes. Accordingly, the occurring longitudinal error due to deflections or deformations is sharply reduced on the whole compared with the conventional measurement strips and turns out to be negligibly small for most measurement tasks, even under stricter requirements. The viscous intermediate film further ensures that the composite action of the stripes is damped against vibrations in comparison to a thick strip.

In the following, the invention is described more fully in principle with reference to the drawing.

DESCRIPTION OF THE PREFERRED EMBODIMENTS

Figure 1:
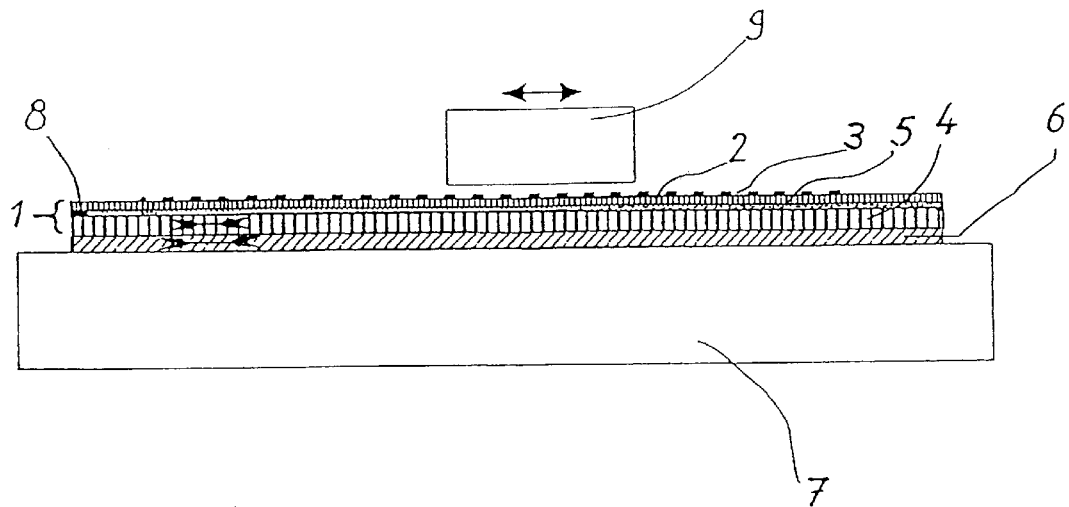
FIG. 1 shows a cross section through a basic view of a measuring device with a measurement strip according to the invention, whose lower stripe is glued onto a holder.

FIG. 1 shows an analog measurement device with a measurement strip 1 which is formed of a thin stripe 2 lying on the top which carries a linear measurement scale 3 and a thicker stripe 4 located under the stripe 2, wherein stripes 2 and 4 are connected with one another via a viscous intermediate film 5 of silicone oil. The stripe 2 carrying the measurement scale 3, referred to hereinafter as the "scale carrier", is formed of a polished commercially available special steel strip such as that produced by the Sandvik company as type 7C27Mo2 with high surface quality (microroughness less than 0.05 μm). The underlying, thicker stripe 4, referred to hereinafter as the "fixing strip", is formed of a commercially available special-steel strip of the same material and surface quality. A silicone oil with a kinematic viscosity of 10,000 mm$^2$/s such as that sold by Wacker-Chemie GmbH under the name "AK10000" is used for the viscous intermediate film 5. In the selected embodiment example, the thickness of the fixing strip 4 is 300 μm. This fixing strip 4 is fixedly connected, by means of a double-sided glue strip 12, with a base bed 7 (for example, a machine bed or a clamping table), wherein, for example, a glue strip by the 3M company known as "Scotch double-sided gluing film No. 9485" can be used.

At one end of the measurement strip 1 (at the left end as shown in FIG. 1), the upper stripe (scale carrier) 2 is fixedly connected with the fixing strip 4 via a locally rigid glue connection 8, wherein an epoxy glue available as Type 380 from the Polytech company can be used, for example, for the glue connection. Due to the rigid gluing of the fixing strip 4 with the base bed 7, a fixed point of the measurement system is realized via this gluing point. When the fixing strip 4 is glued on with the glue strip 6, inevitable longitudinal forces in the glue strip 6 as well as in the fixing strip 4 lead to internal stresses which are indicated in FIG. 1 on the left-hand side of the sectional view in each of the two layers by arrows facing one another, which internal stresses also lead to changes in length. However, these changes in length are not transmitted by the viscous intermediate film 5, so that the scale carrier 2 (upper stripe) which carries the measurement scale is fastened to the fixing strip 4 so as to be uncoupled with respect to tension.

The upper stripe (scale carrier) 2 is formed of a special-steel strip with a thickness of 200 μm and a width of 10 mm, has a high scale accuracy with respect to the graticule or grid division 3, namely, 1 μm/m, and can be transmitted by means of this tension-uncoupled fastening with an accuracy of less than 1 μm/m of the measurement length. Other deformations of the base bed 7, e.g., mechanical or thermal deformations, are also only transmitted to the lower stripe 4 (fixing strip), while the upper stripe 2 with the measurement scale 3 remains completely free of tension.

As is shown in FIG. 1, a measurement head 9 which is movable toward both sides in the indicated arrow direction is arranged above the measurement strip 1 and a sensing of the measurement scale 3 of the measurement strip 1 can be effected along the measuring direction by this measurement head 9 (the measurement head 9 is only shown schematically and for the sake of a clearer understanding).

Figure 2:
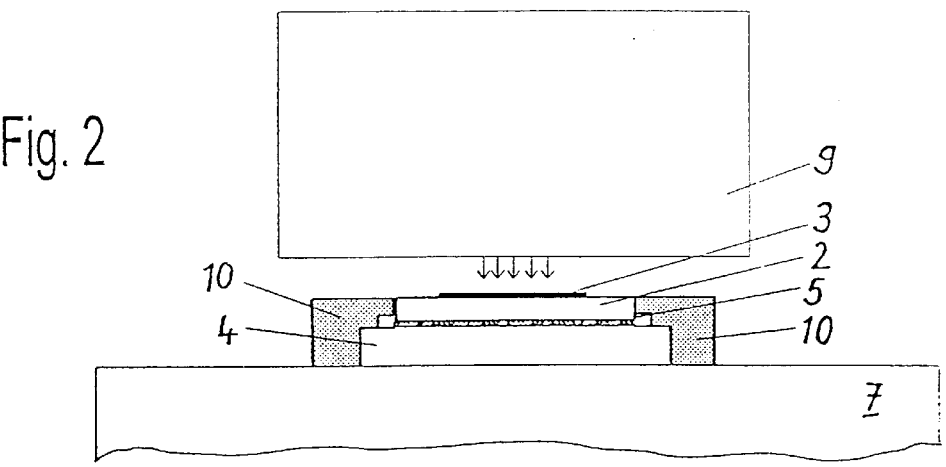
FIG. 2 shows a section (transverse to the longitudinal direction) through a measuring device with a measurement strip according to the invention whose stripe not carrying the measurement scale is tightened on a clamping base.
Figure 3:
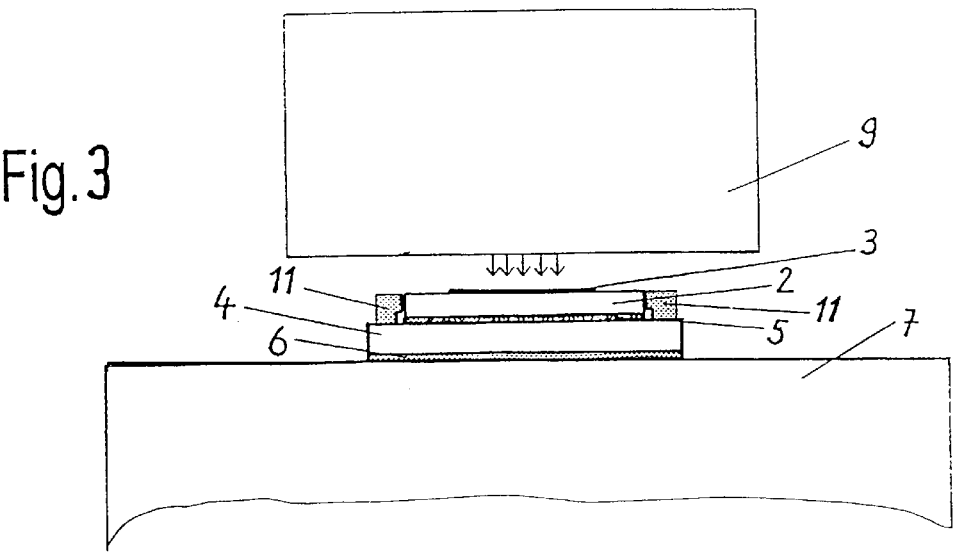
FIG. 3 shows a section (transverse to the longitudinal direction) through a measuring device with a measurement strip, according to the invention, in which the stripe (fixing strip) not carrying the measurement scale is fastened to a base bed and lateral guide elements for the stripe carrying the measurement scale are arranged on it.

FIGS. 2 and 3 show two additional schematic cross sections (transverse to the longitudinal direction) through a measuring arrangement in which the scale carrier 2 carrying the measurement scale (graticule division) 3 is again connected via a viscous intermediate film 5 with the lower stripe (fixing strip) 4 which is fastened in turn to a base bed 7. In the arrangement shown in FIG. 2, lateral clamping elements 10 are arranged along the longitudinal edges of the fixing strip 4 which is clamped to the base bed 7 by means of these lateral clamping elements 10. These lateral clamping elements are so constructed that, with their side edges facing one another, they also simultaneously provide, in addition to the fixed connection of the fixing strip 4, a lateral position alignment of the upper stripe 2 carrying the scale 3. For this purpose, the fixing strip 4 is wider than the upper stripe 2 carrying the measurement scale 3, wherein the clamping action of the lateral clamping elements 10 is effected in the region of the fixing strip 4 which projects laterally over the scale carrier 2 and this fixing strip 4 can be tightened against the base bed 7 from above.

The arrangement according to FIG. 3 differs from that in FIG. 2 in that the fixing strip 4 which also projects out laterally in this case is again rigidly fastened to the base bed 7 by means of a gluing 6 (for example, in the form of a double-sided gluing strip or the like), whereas guide elements 11 are glued onto its upper regions located laterally along the width of the upper stripe 2 carrying the measurement scale 3 for lateral guidance of the scale carrier 2.

In both cases, the measurement head 9 is again displaceable in the longitudinal direction of the device above the scale carrier 2 for sensing the measurement scale 3.

Figure 4:
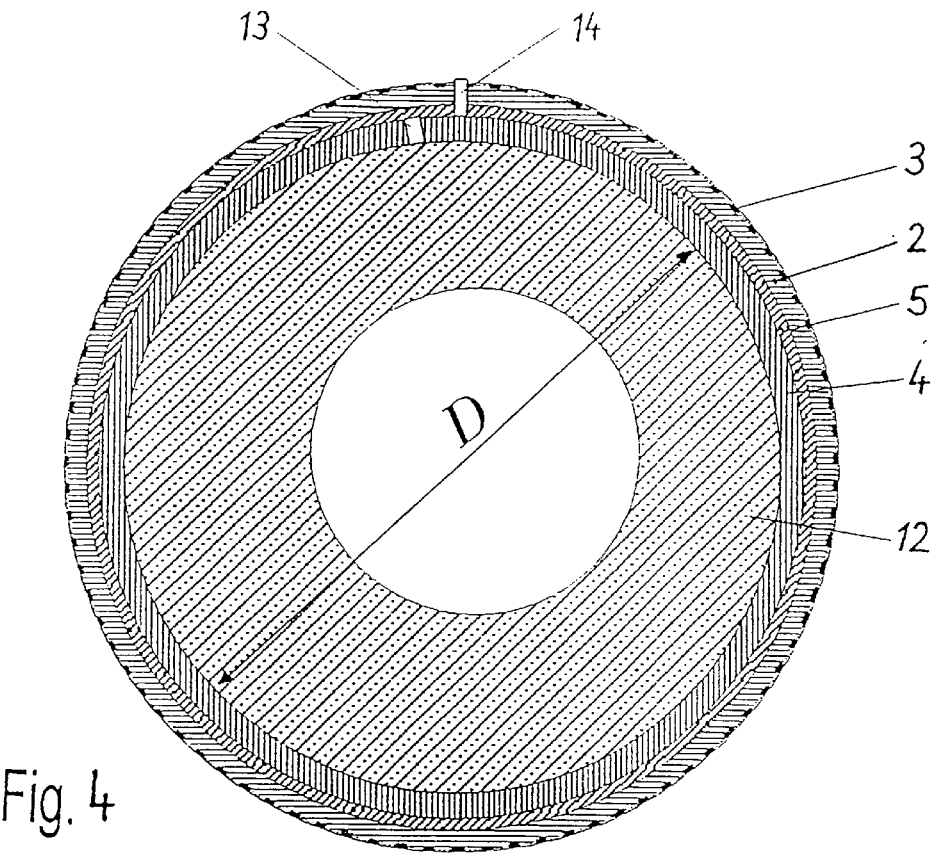
FIG. 4 shows a cross section through an angle measuring device with a measurement strip according to the invention.
Figure 5:
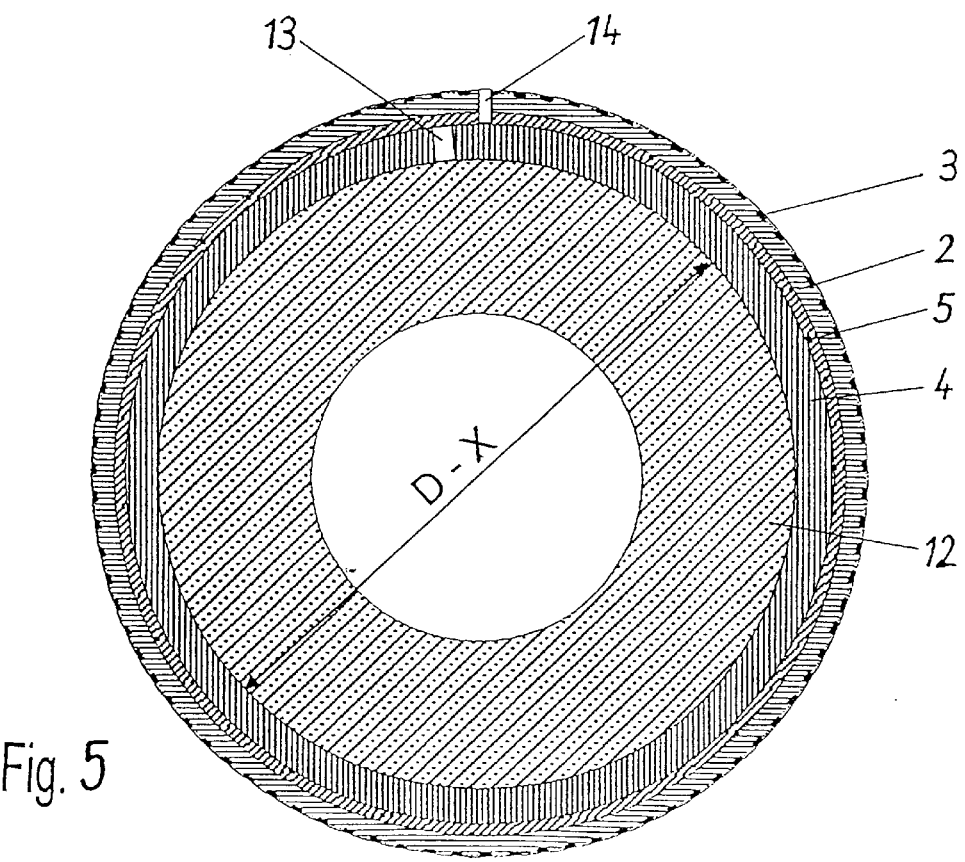
FIG. 5 shows a cross section corresponding to FIG. 4 through an angle measuring device with a measurement strip according to the invention, but with a manufacturing deviation in the diameter of the cylindrical base body.

Like FIG. 5, FIG. 4 likewise shows a cross section through an angle measuring device which has a cylindrical base body 12 with a diameter D which is preferably formed by a drum-shaped base body.

A measurement strip comprising two stripes 2 and 4 is placed around the cylindrical outer casing of the base body 12, this measurement strip being tensioned around the outer circumference of the base body 12. For this purpose, the measurement strip is so tensioned by means of a tension lock (not shown in the Figure) that the desired graticule or grid period is also adjusted at the joining location even when a small longitudinal gap 13 or 14 is adjusted between the ends of the fixing strip 4 and scale carrier 2.

In the embodiment example shown in FIG. 5, the outer diameter of the drum-shaped base body 12 is somewhat smaller than in the example in FIG. 4 because of a manufacturing deviation X from the nominal value of the diameter. In order to compensate for this, the measurement strip which is used for wrapping around the outer circumference of the base body 12 is one in which the fixing strip 4 has a thickness which is somewhat greater than in the construction according to FIG. 4, that is, greater to the extent that the manufacturing-induced deviation in diameter is precisely compensated for. The ratios shown in FIG. 5 are identical to those in FIG. 4 in other respects. The same could also be true in the reverse direction when the diameter deviation in manufacture was such that the ultimately achieved diameter is somewhat greater than the desired nominal diameter, wherein a correspondingly thick fixing strip 4 would then have to be used to compensate for this diameter deviation.

While the foregoing description and drawings represent the present invention, it will be obvious to those skilled in the art that various changes may be made therein without departing from the true spirit and scope of the present invention.

What is claimed is:

1. An elastically flexible measurement strip for length measuring devices or angle measuring devices, comprising:
    two elastically flexible stripes separated from each other by a viscous intermediate film adapted to prevent any adhesive friction between said stripes, said viscous intermediate film holding said stripes by capillary action; and
    a measurement scale being applied to one of said stripes.

2. The measurement strip according to claim 1, wherein the stripe not carrying the measurement scale comprises, in turn, two strips adhering to one another by a viscous intermediate film.

3. The measurement strip according to claim 1, wherein the viscous intermediate film comprises silicone oil.

4. The measurement strip according to claim 3, wherein the viscous intermediate film has a thickness of 1 µm to 5 µm.

5. The measurement strip according to claim 1, wherein the viscous intermediate film comprises silicone grease.

6. The measurement strip according to claim 1, wherein the viscosity of the intermediate film ranges from 3,000 mm$^2$/s to 50,000 mm$^2$/s.

7. The measurement strip according to claim 1, wherein the stripe not carrying the scale is wider than the stripe carrying the measurement scale.

8. The measurement strip according to claim 1, wherein the stripes are formed of steel strips with a ground or polished surface.

9. The measurement strip according to claim 8, wherein the two stripes are made of spring steel with a thickness of 250 µm.

10. The measurement strip according to claim 8, wherein a surface layer having better reflecting characteristics than the surface of the steel strip is applied to the surface of the steel strip carrying the measurement scale.

11. The measurement strip according to claim 1, wherein the two stripes are made of materials having different thermal expansion coefficients.

12. The measurement strip according to claim 1, wherein the two stripes are fixedly connected with one another at one location.

13. The measurement strip according to claim 12, wherein the location of the fixed connection is located at one of the two ends of the measurement strip.

14. The measurement strip according to claim 12, wherein the location of the fixed connection is approximately in the center of the measurement strip.

15. The measurement strip according to claim 1, wherein, for constructing an angle measuring device, it is arranged around the outer circumference of a cylindrical base body, and wherein the stripe not carrying the measurement scale contacts the base body.

16. The measurement strip according to claim 15, wherein the stripe not carrying the measurement scale is connected with the base body in a frictional and/or positive engagement.

17. The measurement strip according to claim 15, wherein the stripe not carrying the measurement scale has lateral guide elements for the stripe carrying the measurement scale.

18. The measurement strip according to claim 15, wherein the stripe carrying the measurement scale is subjected to tensile stress in the installed state.

19. The measurement strip according to claim 18, wherein the ends of the stripe carrying the measurement scale are connected with one another by tension locks.

20. The measurement strip according to claim 15, wherein the stripe carrying the measurement scale does not extend entirely along the circumference of the base body.

21. The measurement strip according to claim 15, wherein the stripe carrying the measurement scale is fixedly connected with the base body in at least one location.

22. The measurement strip according to claim 2, wherein the strip not carrying the measurement scale comprises, in turn, two strips adhering to one another by an elastic intermediate film.

* * * * *